United States Patent [19]

Miller et al.

[11] Patent Number: 5,255,844
[45] Date of Patent: Oct. 26, 1993

[54] WATER TEMPERATURE CONTROL FOR AUTOMATIC WASHERS

[75] Inventors: James C. Miller, Lincoln Township, Berrien County; David A. Przygocki, Oronoko Township, Berrien County; Lori S. Miller, Lincoln Township, Berrien County, all of Mich.

[73] Assignee: Whirlpool Corporation, Benton Harbor, Mich.

[21] Appl. No.: 918,753

[22] Filed: Jul. 27, 1992

[51] Int. Cl.⁵ ............................. G05D 23/13
[52] U.S. Cl. ..................... 236/12.12; 236/12.15; 68/12.03
[58] Field of Search ............ 236/12.12, 12.14, 12.15; 68/12.03, 207; 134/57 D, 57 R

[56] References Cited

U.S. PATENT DOCUMENTS

| | | | |
|---|---|---|---|
| 2,411,960 | 12/1946 | Dyer | 68/12 |
| 2,619,284 | 11/1952 | Maddock-Clegg et al. | 236/12 |
| 2,844,320 | 7/1958 | Cate | 236/12 |
| 2,844,321 | 7/1958 | Witherspoon, Jr. | 236/12.12 |
| 3,207,435 | 9/1965 | Erickson et al. | 236/12.12 |
| 3,362,197 | 1/1968 | Reed | 68/207 X |
| 3,521,470 | 7/1970 | Bochan | 68/12.03 X |
| 4,031,911 | 6/1977 | Frazar | 236/12.12 X |
| 4,147,297 | 4/1979 | Worst | 236/12 A |
| 4,330,081 | 5/1982 | McMillan | 236/12 R |
| 4,406,401 | 9/1983 | Nettro | 236/12.12 |
| 4,528,709 | 7/1985 | Getz et al. | 8/158 |
| 4,643,350 | 2/1987 | DeSchaaf et al. | 236/12.12 |
| 4,978,058 | 12/1990 | Duncan et al. | 236/12.14 X |

Primary Examiner—Harry B. Tanner
Attorney, Agent, or Firm—Stephen D. Krefman; Thomas J. Roth; Thomas E. Turcotte

[57] ABSTRACT

A water temperature control system for achieving one of a plurality of wash water temperatures for a washing machine having a hot water valve, a cold water valve and an inlet conduit for carrying a combined supply of water from the hot and cold water valves to a wash bath. If a WARM FILL option is selected by the user, the cold water valve is continuously energized thereby maintaining the valve in an open condition and a normally closed temperature responsive switch is connected in series with the hot water valve. The normally closed temperature responsive switch has a predetermined temperature set point and is located on the inlet conduit. The normally closed temperature responsive switch operates to cycle the hot water valve on and off to control the inlet wash water temperature at or below the first preselected set point. If a HOT FILL option is selected, the hot water valve is continuously energized and a normally open temperature responsive switch is connected in series with the cold water valve. The normally open temperature responsive switch has a predetermined temperature set point and is located on the inlet conduit. The normally open temperature responsive switch operates to cycle the cold water valve on and off to control the inlet wash water temperature to at or below the second preselected set point.

7 Claims, 3 Drawing Sheets

WATER TEMPERATURE CONTROL FOR AUTOMATIC WASHERS

BACKGROUND OF THE INVENTION

1. Field of the Invention

This invention relates to automatic washing machines and, more particularly, to automatic washing machines that have a system for controlling the temperature of fill water introduced into the washer tub.

2. Description of the Prior Art

Systems for providing selectable water fill temperatures in clothes washers are well known. For example, sophisticated and expensive systems employing temperature sensors and microprocessor controls have been employed. U.S. Pat. Nos. 4,330,081, 4,406,401, 4,528,709 and 4,643,350 all disclose water temperature control systems for automatic washers utilizing costly microprocessor controls for storing and processing temperature data for achieving desired fill temperatures. These systems all have the disadvantage of being relatively costly and relatively complicated.

More economical systems that merely turn on one or both water valves to achieve hot, cold or warm have also been employed. U.S. Pat. No. 4,147,297 discloses a temperature sensing system which utilizes electro-mechanical means but is only responsive to the incoming hot water supply. No temperature sensing means for the incoming mixed hot and cold water is provided.

There is, therefore, a need for an accurate, low cost apparatus and method for controlling fill water temperatures responsive to the temperature of the combined incoming supply of water from a hot water inlet valve and a cold water inlet valve. Furthermore, there is a need for a relatively low cost improved water temperature control apparatus and method responsive to the temperature of the combined supply of hot and cold water, which apparatus and method can control the operation of the hot water inlet valve and cold water inlet valve such that the combined supply of water flowing into the wash bath will always be maintained below a preselected one of two alternate predetermined temperature levels.

SUMMARY OF INVENTION

Thus, in accordance with the invention, there is provided a water temperature control system for an automatic washing machine for achieving one of a plurality of wash water temperatures. The invention utilizes a simple control system having temperature responsive switches located on an inlet conduit downstream from the junction of the hot and cold water supply lines. A combined supply of water flows through the inlet conduit into a wash bath.

If a WARM FILL option is selected by the user, the cold water valve is continuously energized thereby maintaining the valve in an open condition and a normally closed temperature responsive switch is connected in series with the hot water valve. The normally closed temperature responsive switch has a predetermined temperature set point and is located on the inlet conduit. The normally closed temperature responsive switch operates to cycle the hot water valve on and off to control the inlet wash water temperature at or below the first preselected set point.

If a HOT FILL option is selected, the hot water valve is continuously energized and a normally open temperature responsive switch is connected in series with the cold water valve. The normally open temperature responsive switch has a predetermined temperature set point and is located on the inlet conduit. The normally open temperature responsive switch operates to cycle the cold water valve on and off to control the inlet wash water temperature to at or below the second preselected set point.

Therefore, an object of this invention is to provide an apparatus and method for controlling the temperature of the fill water introduced into the washing machine tub which is of low cost and requires only simple electro-mechanical control means. A further object is to provide a water temperature control and method responsive to the combined supply of hot and cold water flowing through an inlet conduit which can provide for selecting a HOT FILL or WARM FILL option with temperature levels maintained at the lowest acceptable temperature regardless of the temperature of the hot water supply.

Other objects and advantages of the present invention ma become apparent to those skilled in the Art, upon reference to the accompanying description when taken in conjunction with the following drawings.

DESCRIPTION OF THE PREFERRED EMBODIMENTS

Figure 1:
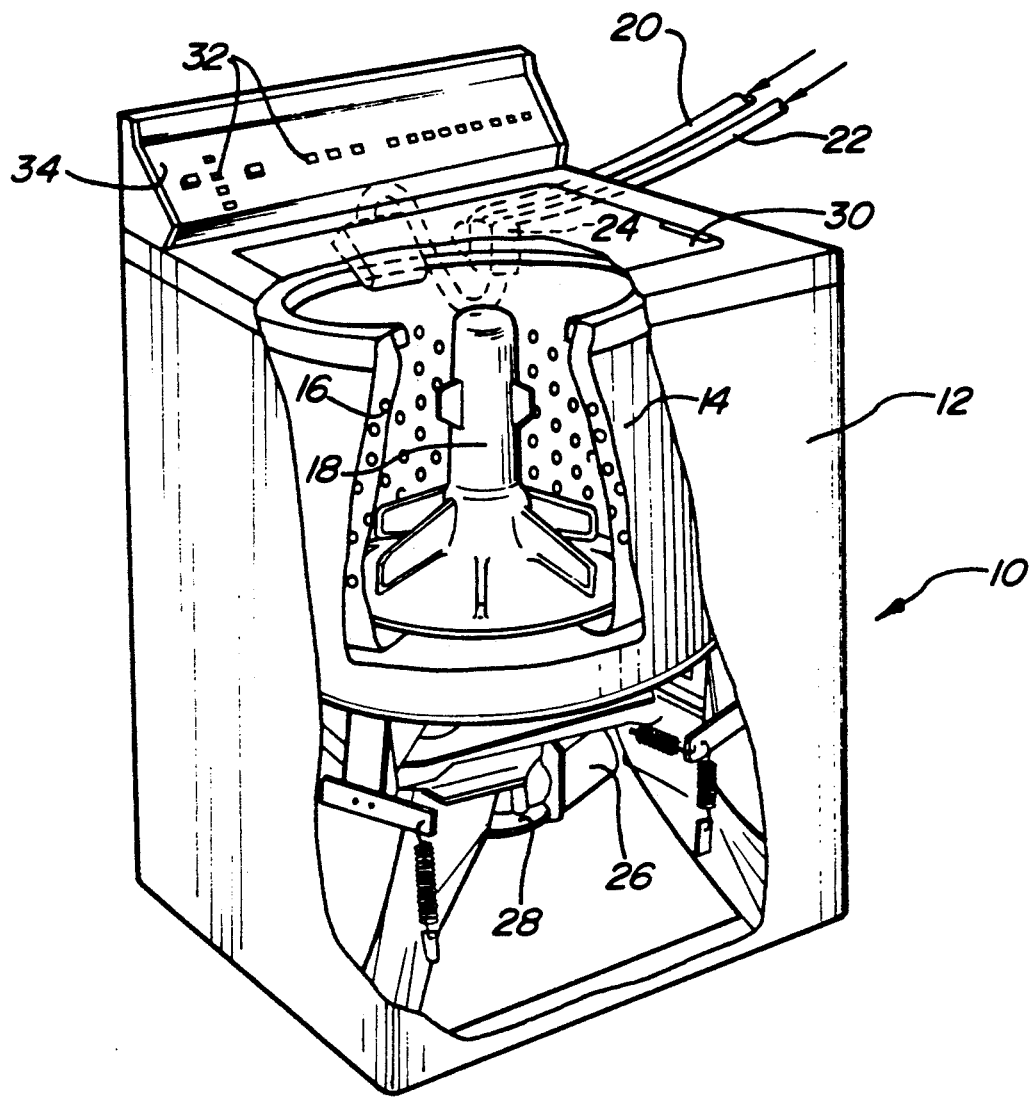
FIG. 1 is a perspective view of an automatic washer embodying the principles of the present invention partially cut away to show the interior thereof.

In FIG. 1, an automatic washing machine is shown generally at 10 comprising a cabinet or housing 12, and an imperforate tub 14, a concentrically mounted basket 16 with a vertical agitator 18, hot and cold water supplies 20 22, an inlet mixing valve 24, and an electrically driven motor 26 operably connected via a transmission 28 to the agitator 18 and the basket 16 An openable lid 30 is provided on the top wall of the cabinet for access into the basket 16. Controls 32 include a presettable sequential control means for use in selectively operating the washing machine through a programmed sequence of washing, rinsing and drying steps are provided on a console panel 34.

Figure 2:
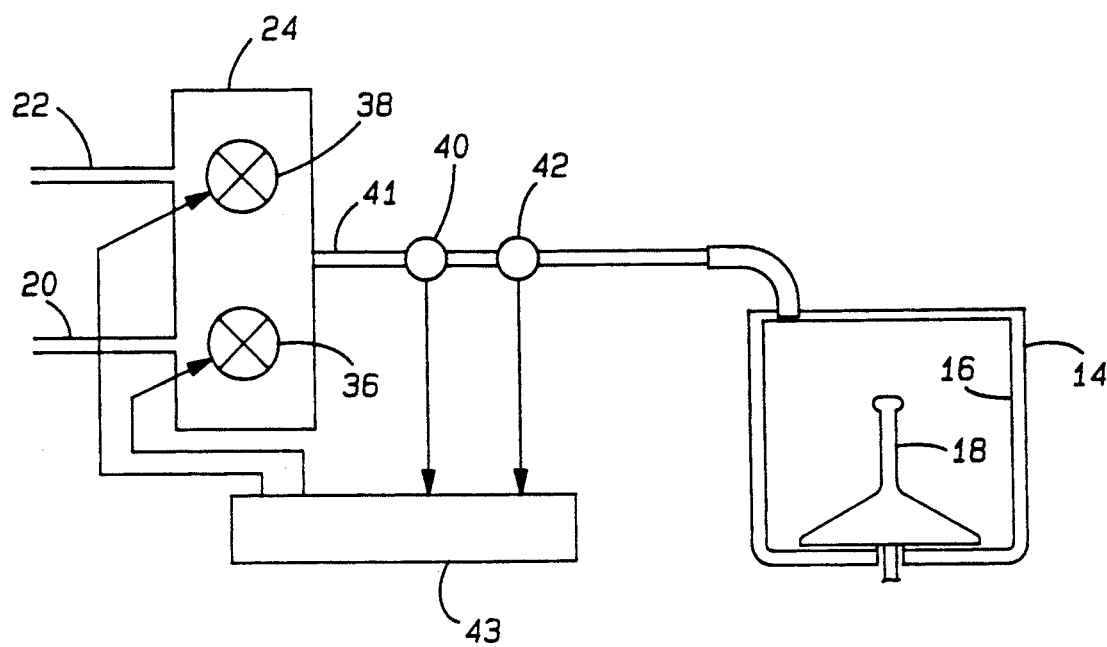
FIG. 2 is a schematic block diagram of the control apparatus of the present invention.

Referring to FIG. 2, a schematic block diagram of the control system of the present invention is shown. The hot water supply line 20 and the cold water supply line 22 are connected to a mixing valve 24 and ar controlled by a hot water valve 36 and a cold water valve 38, respectively. Water from a mixing valve 24 flows through a conduit 41 into the tub 14. Located on the conduit 41 is a first temperature sensing means such as a first normally open temperature responsive switch 40 and a second temperature sensing means, such as a second normally closed temperature responsive switch 42. Electrically connecting the first and second temperature sensing means with the cold water valve 38 and the hot water valve 36 is a control means 43, such as manually operated switches and a timer.

Figure 3:
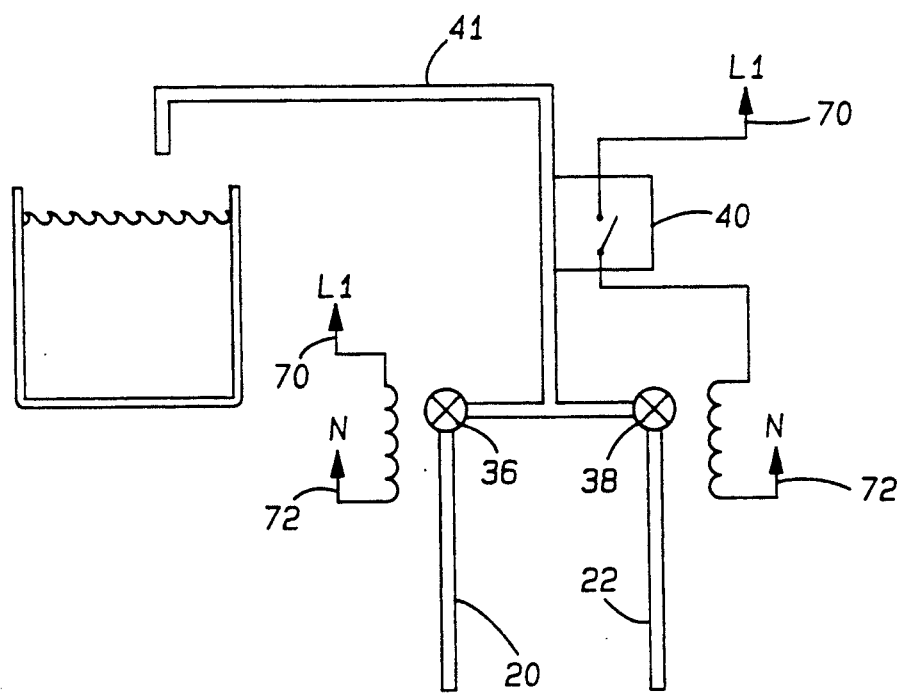
FIG. 3 is a schematic electrical diagram of the control system for the HOT FILL option of the present invention.
Figure 4:
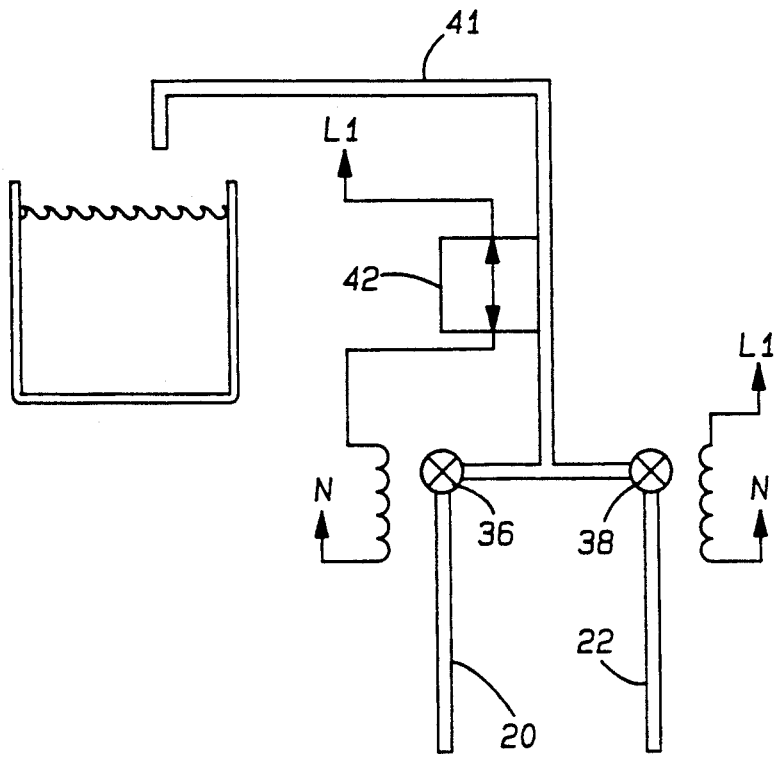
FIG. 4 is a schematic electrical diagram of the control system for the WARM FIL option of the present invention.

The hot water valve 36 and the cold water valve 38 are controlled by a control apparatus as shown schematically in FIG. 3 and FIG. 4, to provide a HOT FILL option and a WARM FILL option, respectively.

In the preferred embodiment, the normally open temperature responsive switch 40, such as a thermostat, has a first predetermined temperature set point preferably around 130° F. That is, the temperature responsive switch 40 may have a first predetermined temperature set point so that the switch will close when the water flowing through the conduit 41 reaches the first predetermined temperature.

There is also provided in the preferred embodiment, the normally closed temperature responsive switch 42, such as a thermostat, which has a second predetermined temperature set point preferably around 80° F. That is, the temperature responsive switch 42, may have a second predetermined temperature set point so that the switch will open when water flowing through conduit 41 reaches the second predetermined temperature.

During the HOT FILL option, as shown in FIG. 3, the hot water valve 36 is continuously energized, thereby maintaining the valve in an open condition, by a power supply (not shown) through lines 70 and 72. The cold water valve 38 is connected in series with the normally open temperature responsive switch 40 such that when the temperature of the water flowing though conduit 41 reaches the first predetermined temperature set point, the temperature responsive switch 40 will close, energizing the cold water valve 38. When the temperature of the water flowing through conduit 41 falls below the first predetermined temperature set point, the temperature responsive switch 40 opens deenergizing and thereby closing the cold water valve 38. In this manner, the cold water valve 38 is cycled on and off in response to temperature changes such that the final temperature of the wash liquid in tub 14 is controlled to at or below the first predetermined temperature set point.

During the WARM FILL option as shown in FIG. 4., the cold water valve 38 is continuously energized by a power supply (not shown) through the lines 70 and 72. The hot water valve 36 is connected in series with the normally closed temperature responsive switch 42 such that when the temperature of the water flowing through conduit 41 reaches the second predetermined temperature set point, the temperature responsive switch 42 will open deenergizing the hot water valve 36. When the temperature of the water flowing through conduit 41 falls below the second predetermined temperature set point, the temperature responsive switch 40 closes, reenergizing the hot water valve 36. In this manner, the hot water valve 36 is cycled on and off in response to temperature changes such that the final temperature of the wash liquid in the tub 14 is controlled to the second predetermined temperature set point.

Figure 5:
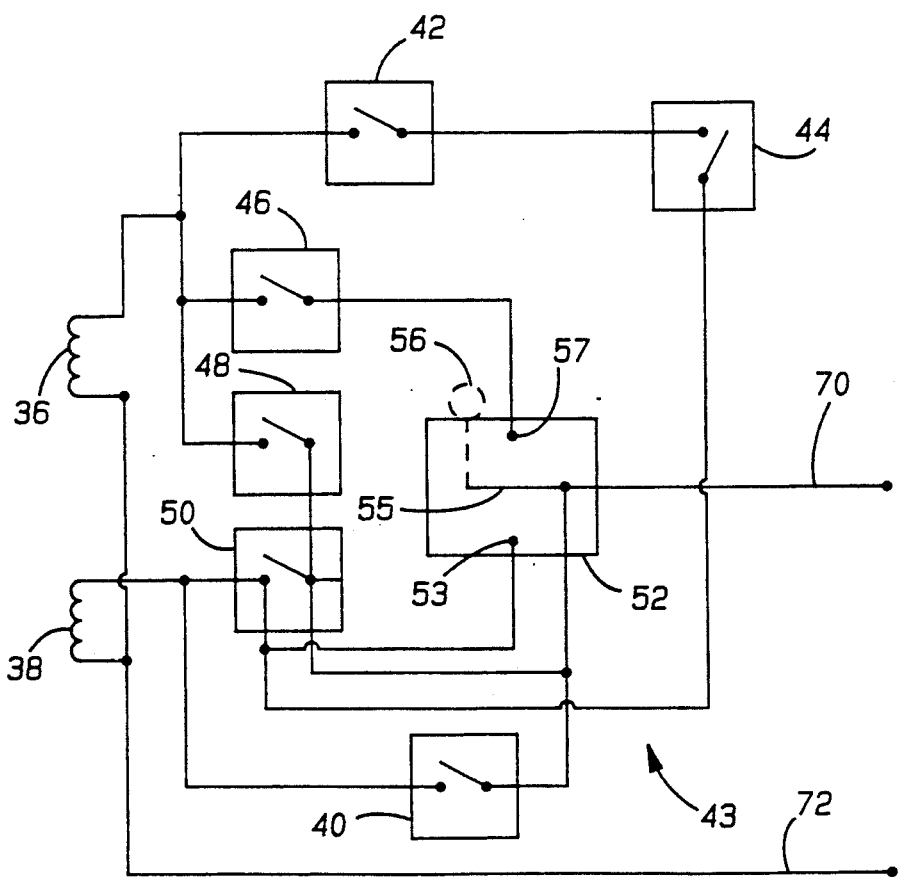
FIG. 5 is a complete schematic electrical diagram of the control circuit of the present invention.

The control system shown in FIG. 3 and FIG. 4 is further described in a more detail in FIG. 5.

The electrical circuit, as shown in FIG. 5, is energized from a power supply (not shown) through the pair of lines 70 and 72. Manually operated switches 44, 46, 48 and 50 allow the user to select fill temperature options. The HOT FILL option is achieved when a timer cam 56 causes a switch 52 to close such that contacts 55 57 are engaged and the switches 44, 48 and 50 are open and the switch 46 is closed. In this condition, the hot water valve 36 is continuously energized and the normally open temperature responsive switch 40 is in series with the cold water valve 38. Since the temperature responsive switch 40 is normally open, the cold water valve 38 is deenergized. When the temperature of water flowing through conduit 41 exceeds the first predetermined temperature set point, the temperature responsive switch 40 closes, energizing the cold water valve 38, thereby opening the cold water valve 38 such that the temperature of the water flowing through conduit 41 is reduced. When the temperature of the water flowing through conduit 41 falls below the first predetermined temperature set point, the temperature responsive switch 40 opens, deenergizing the cold water valve 38. This cycling of the cold water valve 38 on and off during hot water fill controls the hot water fill to at or below the first predetermined temperature set point. The hot water valve 36 and the cold water valve 38 are deenergized when, after a preselected amount of time, the timer cam 56 causes switch 52 to open such that the contacts 55 51 are disengaged.

The controlled WARM FILL option is achieved when the timer cam 56 causes the switch 52 to close such that the contacts 55 53 are engaged and the switches 46 and 48 are open and the switches 50 and 44 are closed. In this condition, the cold water valve 38 is continuously energized and the normally closed temperature responsive switch 42 is in series with the power supply and the hot water valve 36. Since the temperature responsive switch 42 is normally closed, the hot water valve 36 is energized. While temperature of water flowing through the conduit 41 remains below the second predetermined temperature set point, the hot water valve remains energized. If the temperature of the flow of water rises above second predetermined temperature set point, the temperature responsive switch 42 opens and the hot water valve 36 is deenergized. When the temperature of the water flowing through conduit 41 falls below the second predetermined temperature set point, the temperature responsive switch 42 closes, reenergizing the hot water valve 36. This cycling of the hot water valve 36 on and off during hot water fill, controls the hot water fill to approximately the second preset temperature setting of the normally closed temperature responsive switch 42. The hot water valve 36 and the cold water valve 38 are deenergized when, after a preselected amount of time, the timer cam 56 causes switch 52 to open such that the contacts 55 53 are disengaged.

The two fill options, HOT FILL and WARM FILL, may be used in a plurality of combinations to provide the user of the automatic washer with various clothes washing options. For example, the user may select a hot wash (HOT FILL option) followed by a warm rinse (WARM FILL option) or a warm wash (WARM FILL option) followed by a warm rinse (WARM FILL option). Furthermore, a COLD FILL option consisting of energizing the cold water valve for a predetermined period of time may be used in combination with the above-described HOT and WARM FILL options to provide three distinct fill temperatures allowing an additional choice for wash and rinse temperatures.

Although the present invention has been described with reference to a specific embodiment, those of skill in the Art will recognize that changes may be made thereto without departing from the scope and spirit of the invention as set forth in the appended claims.

What is claimed is:

1. In an automatic washer having means for containing a wash bath, hot and cold water inlet valves connected to respective sources of hot and cold water, and conduit means for delivering a combined supply of water from said valves to said wash bath, the improvement in controlling the temperature of water delivered to said wash bath comprising:

a first sensing means for sensing the temperature of said combined supply of water through said conduit means to said wash bath; and a first control means for maintaining the hot water inlet valve continuously open for a predetermined period of time and opening said cold water inlet valve in response to said first sensing means when the temperature of said combined supply of water through said conduit means is above a first predetermined temperature and for closing said cold water inlet valve in response to said first sensing means when the temperature of said combined supply of water through said conduit means is below said first predetermined temperature such that said cold water valve is cycled on and off for controlling the temperature of said flow of water to said first predetermined temperature, said first control means further including:

a first circuit for connecting said hot water inlet valve with a power supply for maintaining said hot water inlet valve continuously open for a predetermined period of time, said first circuit further including:

a cam driven switch having a first position and a second position, and a first manual switch in series with said hot water valve, said first circuit being configured such that continuous power is supplied to said hot water inlet valve upon said cam driven switch being in said first position and said first manual switch being closed, and a second circuit connecting said cold water inlet valve to said power supply in series with said first sensing means device.

2. The automatic washer of claim 1 wherein said first sensing means further comprises a first temperature responsive device normally open at or below said first predetermined temperature level and located on said conduit.

3. In the automatic washer of claim 1, the improvement further comprising:

a second sensing means for sensing the temperature of said combined supply of water through said circuit means to said wash bath; and a second control means for maintaining the cold water inlet valve continuously open for a predetermined period of time and opening said hot water inlet valve in response to said second sensing means when the temperature of said combined supply of water through said conduit means is above a second predetermined temperature and closing said hot water inlet valve in response to said second sensing means when the temperature such that said hot water valve is cycled on and off for controlling the temperature of said combined supply of water to said second predetermined temperature, said second control means further including:

a third circuit for connecting said cold water inlet valve with a power supply for maintaining said cold water inlet valve continuously open for a predetermined period of time, said third circuit further including:

a second manual switch in series with said cold water inlet valve, and said cam driven switch, said third circuit being configured such that continuous power is supplied to said cold water valve upon said cam driven switch being in said second position and said second manual switch being closed, and a fourth circuit connecting said hot water inlet valve to said power supply in series with said second sensing means, said fourth circuit including said cam driven switch and a third manual switch in series with said second sensing means such that said hot water inlet valve is connected to said power supply in series with said second sensing means upon said cam driven switch being in said second position and said third manual switch being closed.

4. The automatic washer of claim 3 wherein the second sensing means further comprises a second temperature responsive device normally closed at and below said second predetermined temperature level and located on said conduit.

5. In an automatic washer having means for containing a wash bath, hot and cold water inlet valves connected to respective sources of hot and cold water, and conduit means for delivering a combined supply of water from said valves to said wash bath, the improvement in controlling the temperature of water delivered to said wash bath comprising:

a sensing means for sensing the temperature of said combined supply of water through said conduit means to said wash bath;

a control means for maintaining the cold water inlet valve continuously open for a predetermined period of time and opening said hot water inlet valve in response to said sensing means when the temperature of said combined supply of water through said conduit means is above a predetermined temperature and closing said hot water inlet valve in response to said sensing means when the temperature of the combined supply of water through said conduit means is below said predetermined temperature such that said hot water valve is cycled on and off for controlling the temperature of said combined supply of water to said predetermined temperature, said second control means further including:

a first circuit for connecting said cold water inlet valve with a power supply for maintaining said cold water inlet valve continuously open for a predetermined period of time, said first circuit further including:

a first manual switch in series with said cold water inlet valve, and a cam driven switch having a first position and a second position, said first circuit being configured such that continuous power is supplied to said cold water valve upon said cam driven switch being in said second position and said second manual switch being closed, and a second circuit connecting said hot water inlet valve to said power supply in series with said sensing means, said second circuit including said cam driven switch and a second manual switch in series with said sensing means such that said hot water inlet valve is connected to said power supply in series with said sensing means upon said cam driven switch being in said second position and said second manual switch being closed.

6. The automatic washer of claim 5 wherein the sensing means further comprises a temperature responsive device normally closed at and below said predetermined temperature level and located on said conduit.

7. In an automatic washer having means for containing a wash bath, hot and cold water inlet valves connected to respective sources of hot and cold water, and conduit means for delivering a combined supply of water from said valves to said wash bath, the improvement in controlling the temperature of water delivered to said wash bath comprising:
- a first temperature responsive device normally open at or below a first predetermined temperature level located on said conduit means for sensing the temperature of said combined supply of water flowing through said conduit means to said wash bath;
- a second temperature responsive device normally closed at or below a second predetermined temperature level located on said conduit means for sensing the temperature of said combined supply of water flowing through said conduit means to said bath;
- a first circuit for connecting said hot water inlet valve with a power supply for maintaining said hot water inlet valve continuously open for a predetermined period of time, said first circuit further including:
    - a cam driven switch having a first position and a second position, and
    - a first manual switch in series with said hot water valve, said first circuit being configured such that continuous power is supplied to said hot water inlet valve upon said cam driven switch being in said first position and said first manual switch being closed, and
- a second circuit connecting said cold water inlet valve to said power supply in series with said first temperature responsive device, said first circuit and said second circuit operate together such that when said cam driven switch is in said first position and said first manual switch is closed said hot water inlet valve is maintained continuously open for a predetermined period of time and said cold water inlet valve is opened when the temperature of said combined supply of water flowing through said conduit means is above said first predetermined temperature and said cold water inlet valve is closed when the temperature of said combined supply of water flowing through said conduit means is below said first predetermined temperature;
- a third circuit for connecting said cold water inlet valve with a power supply for maintaining said cold water inlet valve continuously open for a predetermined period of time, said third circuit further including:
    - a second manual switch in series with said cold water inlet valve, and
    - said cam driven switch, said third circuit being configured such that continuous power is supplied to said cold water valve upon said cam driven switch being in said second position and said second manual switch being closed, and
- a fourth circuit connecting said hot water inlet valve to said power supply in series with said second temperature responsive device, said fourth circuit including said cam driven switch and a third manual switch in series with said second sensing means such that said hot water inlet valve is connected to said power supply in series with said second sensing means upon said cam driven switch being in said second position and closing said third manual switch being closed, said third and fourth circuit operate together such that said cold water inlet valve is maintained continuously open for a predetermined period of time, and said hot water inlet valve is kept closed when the temperature of said combined supply of said water flowing through said circuit means is above said second predetermined temperature and the hot water inlet valve is opened when the temperature of said combined supply of water flowing through said conduit means is below said second predetermined temperature; and
- said first manual switch and said third manual switch provide means for bypassing said first control means and said second control means.

* * * * *